United States Patent
Benson et al.

(10) Patent No.: US 8,666,619 B2
(45) Date of Patent: Mar. 4, 2014

(54) TRANSMISSION SYSTEMS AND METHODS

(75) Inventors: Christopher G. Benson, Rochester Hills, MI (US); Matthew R. Malik, Highland, MI (US); Steven Mark Bezdek, Haslett, MI (US); Timothy P. Philippart, Orion, MI (US); Martha A. Crisler, Ann Arbor, MI (US); Stonewall J. Craig, Macomb, MI (US)

(73) Assignee: GM Global Technology Operations LLC

( * ) Notice: Subject to any disclaimer, the term of this patent is extended or adjusted under 35 U.S.C. 154(b) by 275 days.

(21) Appl. No.: 13/114,438

(22) Filed: May 24, 2011

(65) Prior Publication Data

US 2012/0245811 A1  Sep. 27, 2012

Related U.S. Application Data

(60) Provisional application No. 61/467,693, filed on Mar. 25, 2011.

(51) Int. Cl.
*G06F 7/00* (2006.01)

(52) U.S. Cl.
USPC ............................................. 701/55; 477/155

(58) Field of Classification Search
USPC ............... 701/51, 53–60, 62–64; 192/220.24, 192/220, 3.57; 477/155, 168, 152
See application file for complete search history.

(56) References Cited

U.S. PATENT DOCUMENTS 7,192,005 B2 *  3/2007  Denyer et al. ............. 251/129.08
7,349,754 B1     3/2008  Palansky et al.

OTHER PUBLICATIONS

U.S. Appl. No. 12/703,865, filed Feb. 11, 2010, Christopher G. Benson.

* cited by examiner

*Primary Examiner* — Thomas Black
*Assistant Examiner* — Luke Huynh

(57) ABSTRACT

A method includes: receiving M solenoids, each marked with a unique one of M identifiers, where M is an integer greater than one; receiving M lookup tables associated with respective ones of the M identifiers, wherein each of the M lookup tables establishes a relationship between input current and output pressure for only one of the M solenoids; assembling a transmission with a selected one of the M solenoids; selecting one of the M lookup tables based on one of the M identifiers marked on the selected one of the M solenoids; storing the selected one of the M lookup tables in memory of a transmission control module of a vehicle that is assembled with the transmission; and controlling output pressure of the selected one of the M solenoids based on the selected one of the M lookup tables and the input current using the transmission control module.

20 Claims, 12 Drawing Sheets

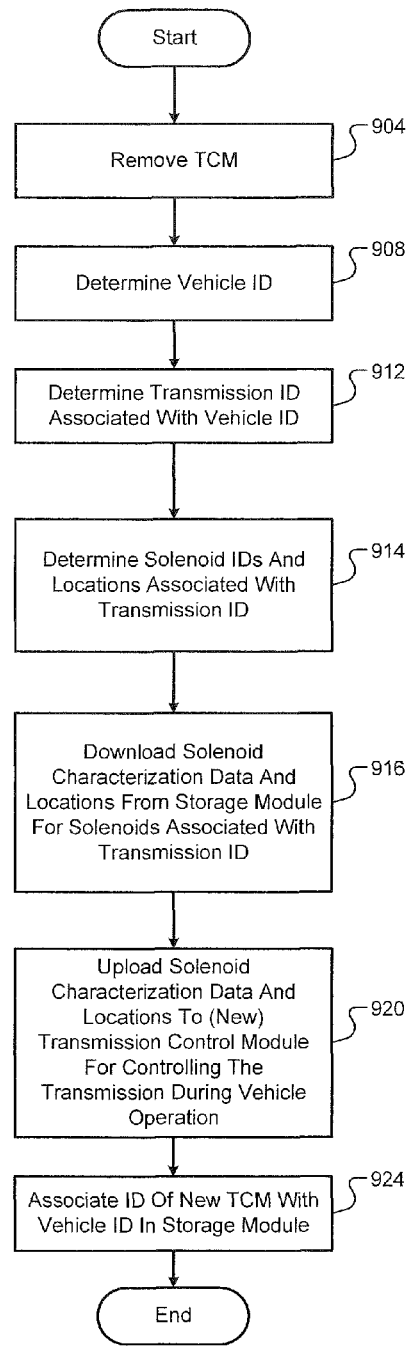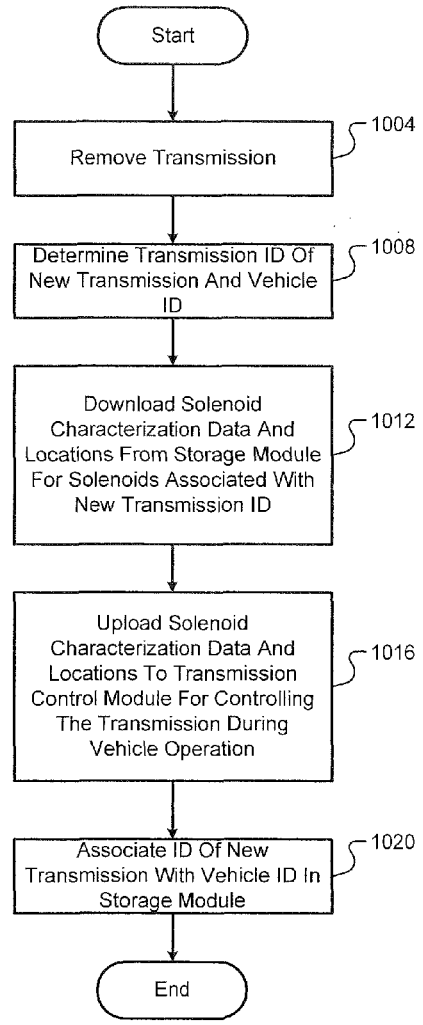
FIG. 9  FIG. 10

TRANSMISSION SYSTEMS AND METHODS

CROSS-REFERENCE TO RELATED APPLICATIONS

This application claims the benefit of U.S. Provisional Application No. 61/467,693, filed on Mar. 25, 2011. The disclosure of the above application is incorporated herein by reference in its entirety.

FIELD

The present disclosure relates to vehicle assembly systems and methods and more particularly to transmission systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

FIG. 1 includes a flowchart depicting an example process of manufacturing a transmission and a vehicle. A vehicle manufacturer may receive a transmission electro-hydraulic control module (TEHCM) from an electronics/hydraulics supplier at 104. The TEHCM includes a plurality of transmission solenoids, a module body, and a transmission control module (TCM). The electronics/hydraulics supplier assembles the transmission solenoids into the module body. The electronics/hydraulics supplier assembles the module body and the TCM into the TEHCM.

After receiving the assembled TEHCM from the electronics/hydraulics supplier, the vehicle manufacturer assembles the TEHCM into a transmission at 108. The vehicle manufacturer may test the operability of the transmission and the TEHCM at 112. If the test is passed at 116, the vehicle manufacturer may assemble the transmission and the TEHCM into a vehicle including linking the TCM with a car area network (CAN) at 120. The vehicle manufacturer may test the vehicle at 124. If the test is not passed at 116, the vehicle manufacturer may flag the transmission and the TEHCM at 128.

SUMMARY

A method includes: receiving M solenoids, each marked with a unique one of M identifiers, where M is an integer greater than one; receiving M lookup tables associated with respective ones of the M identifiers, wherein each of the M lookup tables establishes a relationship between input current and output pressure for only one of the M solenoids; assembling a transmission with a selected one of the M solenoids; selecting one of the M lookup tables based on one of the M identifiers marked on the selected one of the M solenoids; storing the selected one of the M lookup tables in memory of a transmission control module of a vehicle that is assembled with the transmission; and controlling output pressure of the selected one of the M solenoids based on the selected one of the M lookup tables and the input current using the transmission control module.

In other features, a method includes: receiving data at a storage module indicating a unique identifier marked on a solenoid; receiving a lookup table at the storage module that is associated with the unique identifier and that establishes a relationship between input current and output pressure for the solenoid; storing the lookup table from the storage module in memory of a transmission control module of a vehicle; and controlling output pressure of the solenoid within a transmission of the vehicle based on the lookup table using the transmission control module.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 9-12 are flowcharts depicting example methods of removing and replacing a component of a vehicle according to the present disclosure.

DETAILED DESCRIPTION

Figure 1:
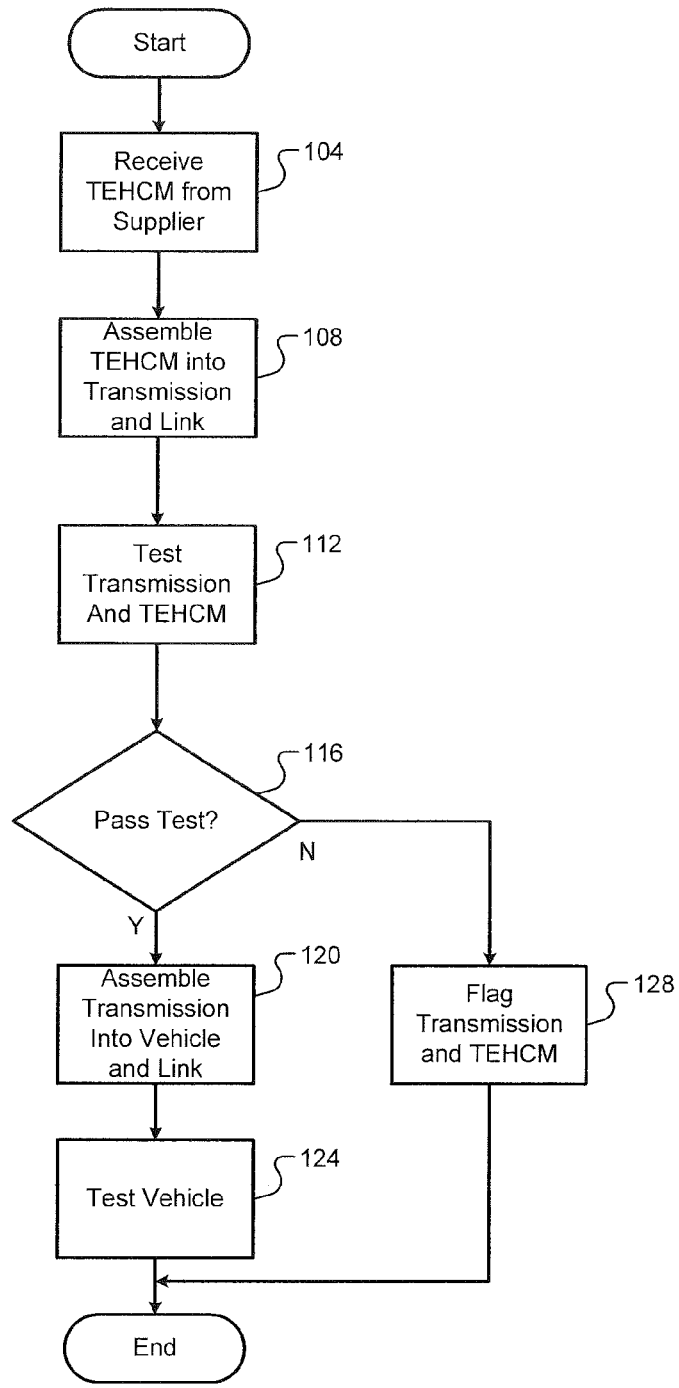
FIG. 1 is a flowchart depicting an example method of assembling a vehicle and a transmission.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a systemon-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A manufacturer can receive a transmission electro-hydraulic control module (TEHCM) and assemble the TEHCM into a housing of a transmission. The TEHCM includes a plurality of solenoids implemented within a module body. The TEHCM also includes a transmission control module that is implemented within the TEHCM housing and that controls the solenoids.

According to the present disclosure, a manufacturer may receive solenoids, module bodies, and transmission control modules from one or more suppliers. When received, each of the solenoids should have a unique identifier. The manufacturer can obtain relationship data for a given solenoid based on that solenoid's unique identifier. The relationship data for a given solenoid defines a relationship between current input to the solenoid and pressure output by the solenoid. The relationship data associated with a given solenoid implemented within a transmission and other data for the given solenoid can be obtained and loaded to a transmission control module for use in controlling the given solenoid.

Figure 2:
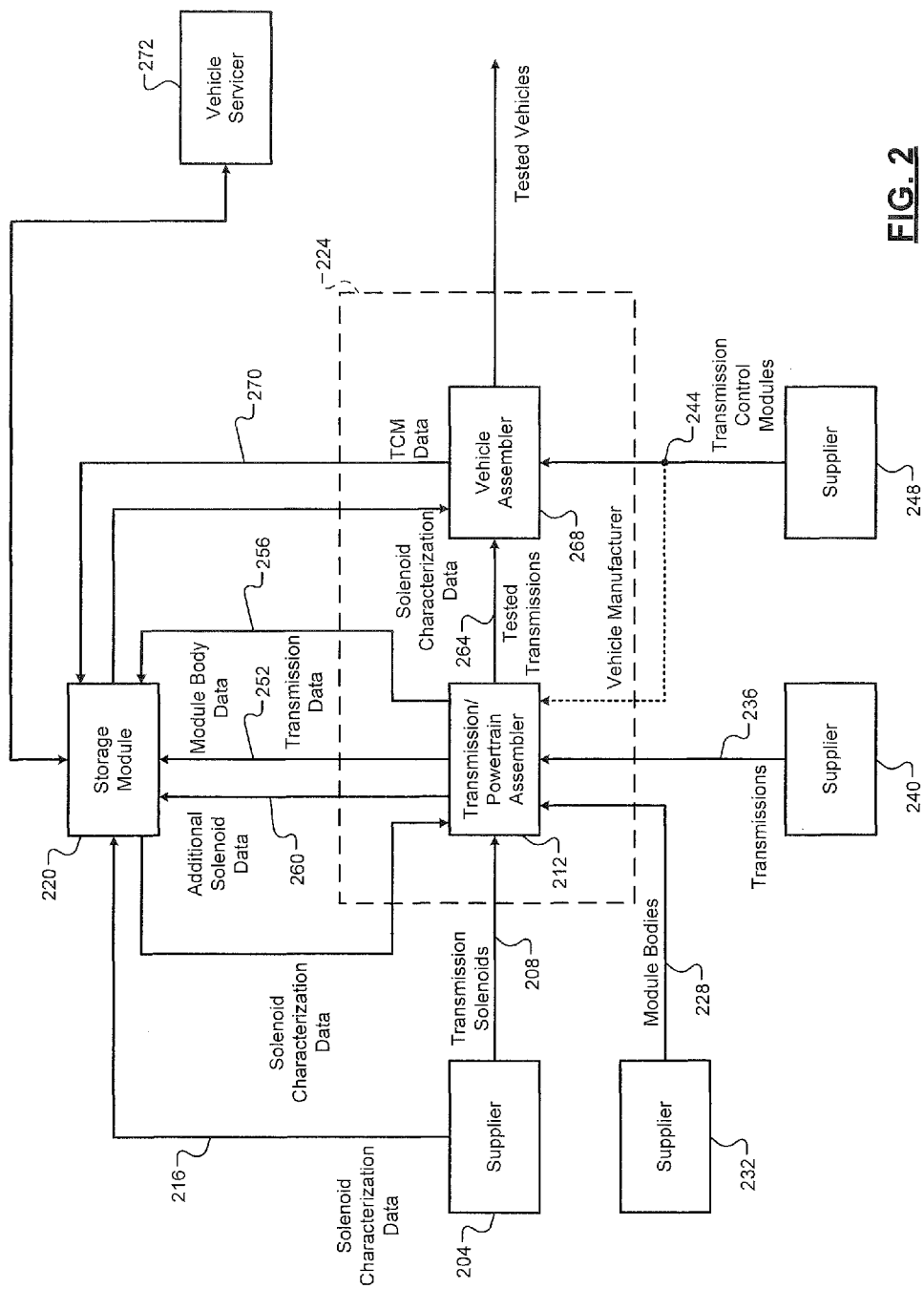
FIG. 2 is a block diagram of an example vehicle assembly system according to the present disclosure.
Figure 3:
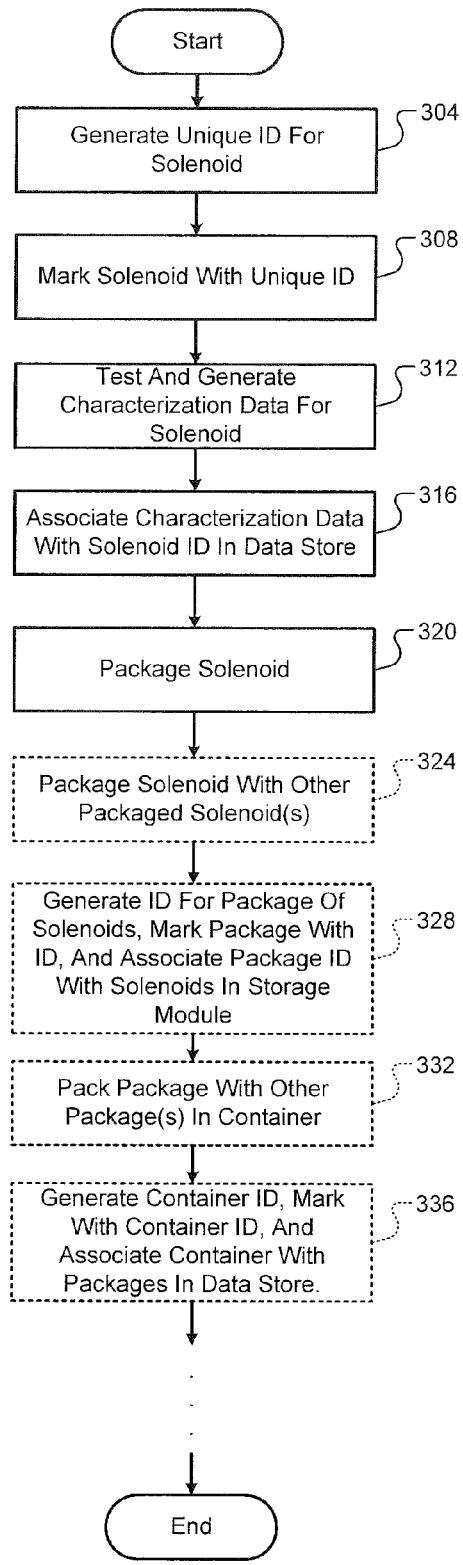
FIG. 3 is a flowchart depicting an example method of providing solenoids and related data for assembly into a transmission according to the present disclosure.

FIG. 2 is a block diagram of an example vehicle assembly system. Referring now to FIG. 2, a solenoid supplier 204 supplies transmission solenoids 208 to a transmission/powertrain assembler 212. FIG. 3 is an example method of supplying solenoids for vehicle transmissions and supplying characterization data for the solenoids 208. While the present disclosure will be discussed in terms of solenoids and transmissions, the principles of the present disclosure may also be applicable to other components of a vehicle.

Referring now to FIGS. 2 and 3, the solenoid supplier 204 may generate a unique identifier (ID) for a given one of the solenoids 208 (hereafter the solenoid 208) at 304. The solenoid ID may include, for example, a barcode readable by a barcode scanner or another suitable type of ID. The solenoid supplier 204 may mark the solenoid 208 with the solenoid ID at 304. For example only, the solenoid supplier 204 may apply a label with the solenoid ID to the solenoid 208, form the solenoid ID into a housing of the solenoid 208, or mark the solenoid 208 with the solenoid ID in another suitable manner.

The solenoid supplier 204 may test the operability of the solenoid 208 and generate characterization data 216 for the solenoid 208 at 312. The characterization data 216 includes data characterizing a relationship between an input (control) to the solenoid 108 and an output (response) produced by the solenoid 208 in response to the input. For example only, the characterization data 216 of the solenoid 208 may include a relationship between current and pressure. The relationship may be an equation, a mapping, or another suitable relationship. For example only, the characterization data 216 of the solenoid 208 may include an N-point mapping of pressure indexed by current. N is an integer greater than 1, and N may be equal to 42 in various implementations.

The solenoid supplier 204 may associate the characterization data 216 with the solenoid ID in a storage module 220 at 316. The storage module 220 may be, for example only, a file server or another suitable type of information storage center that can be accessed via a network, internet, or other type of connection. In this manner, the characterization data 216 is made available for the transmission assembler 212 and externally to the solenoid supplier 204. The transmission assembler 212 may be a component of a larger entity, such as a vehicle manufacturer 224. In various implementations, the transmission assembler 212 may operate independently. The content of the storage module 220 and the ability to read data from and store data to the storage module 220 may be controlled by the vehicle manufacturer 224 in various implementations.

The solenoid supplier 204 may package the solenoid 208 at 320. Before packaging the solenoid 208, the solenoid supplier 204 may mark the solenoid 208 with a second identifier for the characterization data 216 of the solenoid 208 at 308. For example only, the second identifier may include a three-dimensional barcode generated (e.g., encoded) based on the characterization data 216.

The solenoid supplier 204 may package the (now packaged) solenoid 208 with one or more other ones of the solenoids 208 at 324. The solenoid supplier 204 may generate a third ID for the package of solenoids, mark the package of solenoids with the third ID, and index the solenoids within the package by the third ID in the storage module 220 at 328.

The solenoid supplier 204 may pack the package of solenoids with one or more other packages of solenoids within a container at 332. The solenoid supplier may generate a fourth ID for the container of packages of solenoids at 336, mark the container with the fourth ID, and index the solenoids and the packages by the fourth ID at 336. This process of packaging larger groups of similar units/packages may be performed a greater number of times or a lesser number of times before the solenoids 208 are shipped to the transmission assembler 212.

Figure 4:
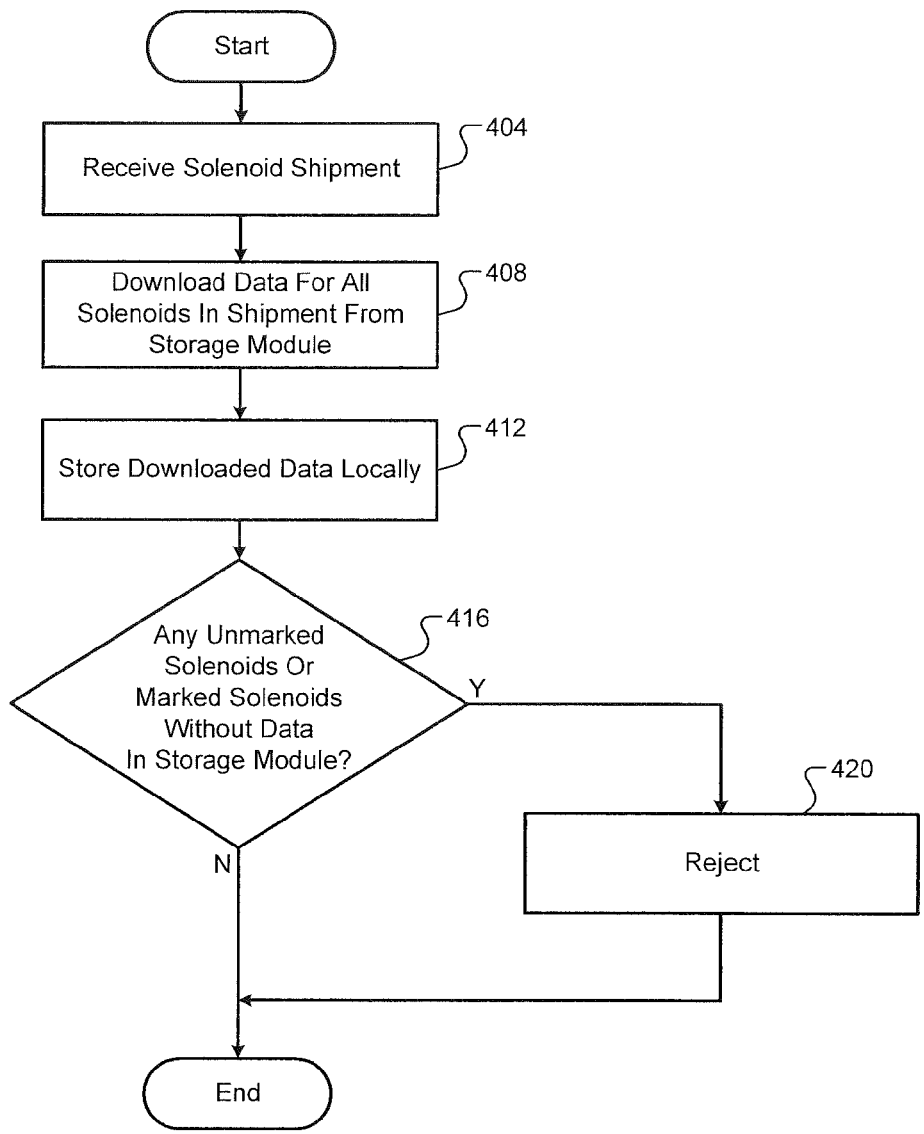
FIG. 4 is a flowchart depicting an example method of receiving and verifying solenoids and solenoid related data according to the present disclosure.

FIG. 4 is an example method of receiving solenoids and preparing for transmission assembly. Referring now to FIGS. 2 and 4, the transmission assembler 212 may receive a shipment of the solenoids 208 at 404. The transmission assembler 212 may download the characterization data for the solenoids 208 in the shipment from the storage module 220 at 408. For example only, if the shipment is a container, the transmission assembler 212 may determine the ID for each of the solenoids 208 associated with the container ID in the storage module 220 and download the characterization data for each of the solenoid IDs from the storage module 220. The transmission assembler 212 may store downloaded characterization data within a local storage module (not shown in FIG. 2) at 412. In this manner, even if a connection to the storage module 220 is unavailable, the transmission assembler 212 can proceed using the downloaded characterization data stored in the local storage module.

At 416, the transmission assembler 212 may determine whether one or more of the solenoids 208 in the shipment are unmarked and/or whether one or more of the solenoids 208 in the shipment are marked with a unique ID, but no characterization data is associated with the unique ID in the storage module 220. The transmission assembler 212 may reject one or more of the solenoids 208 that are unmarked and/or one or more of the solenoids 208 that do not have associated characterization data in the storage module 220 at 420. Marked solenoids associated with characterization data that is stored in the storage module 220 and/or locally may be accepted and used.

Referring to FIG. 2, the transmission assembler 212 also receives other components. For example only, the transmission assembler 212 receives module bodies 228 from a module body supplier 232, transmissions (without module bodies and solenoids) 236 from a transmission supplier 240, and/or one or more other transmission components. The transmission assembler 212 may also receive transmission control modules (TCMs) 244 from a TCM supplier 248. In various implementations, more than one of the solenoid supplier 204, the module body supplier 232, the transmission supplier 240, and the TCM supplier 248 may be a combined entity.

Figure 5A:
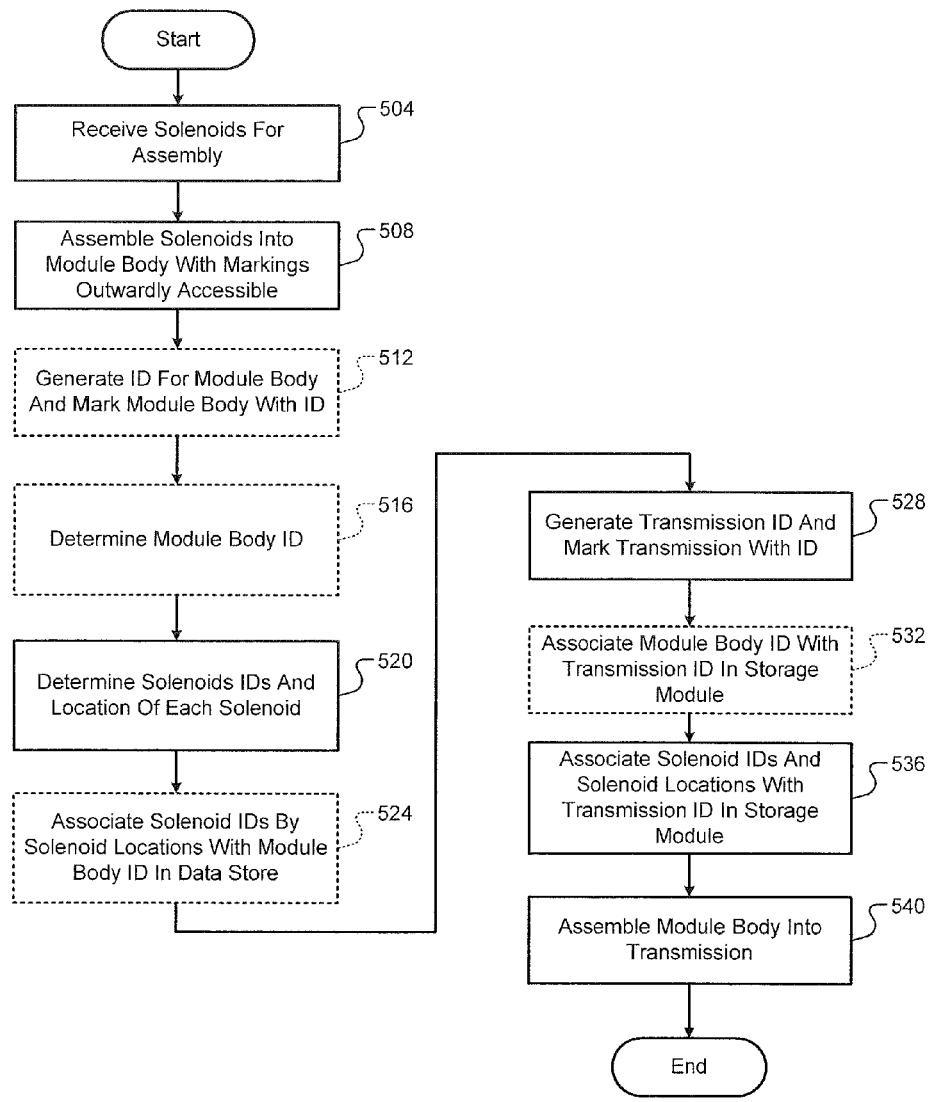
FIGS. 5A and 5B are flowcharts depicting example methods of assembling a transmission according to the present disclosure.
Figure 5B:
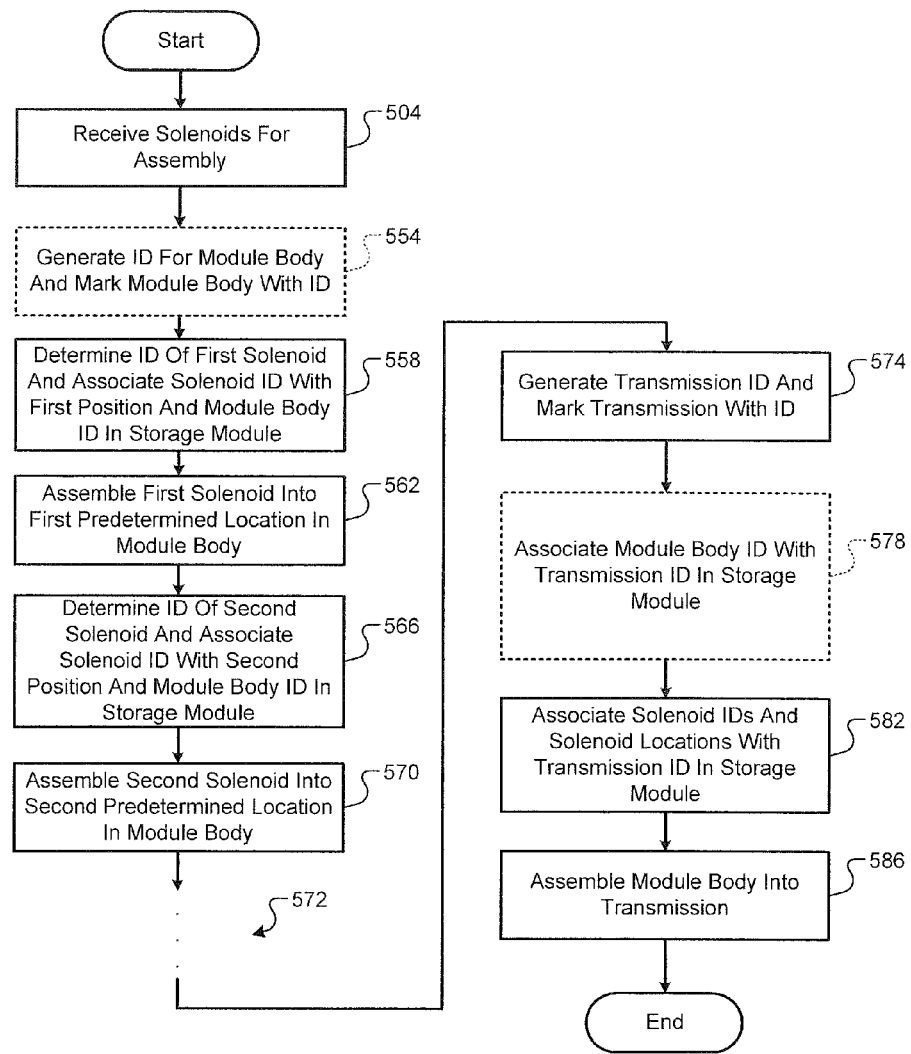

FIGS. 5A and 5B are two example methods of transmission assembly that may be performed by the transmission assembler 212. Referring to FIGS. 2 and 5A, the transmission assembler 212 may receive the solenoids 208 for assembly at 504. The transmission assembler 212 may assemble M-number of the solenoids (hereafter the M solenoids) into one of the module bodies 228 (hereafter the module body 228) at 508. The module body 228 includes M locations for the M solenoids to be added where M is an integer greater than 1. The transmission assembler 212 assembles the M solenoids into the module body 228 with each of the solenoid IDs outwardly accessible (viewable).

The transmission assembler 212 may generate module body data 252 for the module body 228 at 512. For example only, the module body data 252 may include a module body ID for the module body 228. The transmission assembler 212 may also mark the module body 228 with the module body ID at 512. The transmission assembler 212 may determine the module body ID at 516. The transmission assembler 212 may determine the IDs of the M solenoids and the locations of the M solenoids at 520. For example only, the transmission assembler 212 may determine the IDs and the locations using optical recognition or another suitable type of identifier.

At 524, the transmission assembler 212 may store the module body data 252 in the storage module 220. More specifically, the transmission assembler 212 may associate the IDs of the M solenoids and the locations of the M solenoids, respectively, with the module body ID in the storage module 220. The transmission assembler 212 may generate transmission data 256 for one of the transmissions 236 (hereafter the transmission 236) at 528. For example only, the transmission data 256 may include a transmission ID for the transmission 236.

The transmission assembler 212 may store transmission data 252 in the storage module 220 at 532. More specifically, the transmission assembler 212 may associate the module body ID with the transmission ID in the storage module 220. At 536, the transmission assembler 212 may associate the IDs and the locations of the M solenoids with the transmission ID in the storage module 220 at 536. The transmission assembler may assemble the module body 228 (including the M solenoids in the M locations) into the transmission 236 at 540.

Referring to FIGS. 2 and 5B, the transmission assembler 212 may receive the solenoids 208 for assembly at 504. The transmission assembler 212 may generate the module body data 252 for the module body 228 at 554. The transmission assembler 212 may also mark the module body 228 with the module body ID at 554. The transmission assembler 212 may determine the ID of a first one of the M solenoids at 558. For example only, the transmission assembler 212 may determine the ID using optical recognition or another suitable type of identifier. The transmission assembler 212 may associate the ID of the first solenoid with a first location and with the module body ID (or the transmission ID) in the storage module 220 at 558. The transmission assembler 212 may assemble the first solenoid into the first location within the module body 228 at 562.

At 566, the transmission assembler 212 may determine the ID of a second one of the M solenoids. For example only, the transmission assembler 212 may determine the ID using optical recognition or another suitable type of identifier. The transmission assembler 212 may associate the ID of the second solenoid with a second location and with the module body ID (or the transmission ID) in the storage module 220 at 566. The transmission assembler 212 may assemble the second solenoid into the second location in the module body 228 at 570. The transmission assembler 212 may repeat the process of determining the ID of a given one of the M solenoids, associating the ID of the one of the solenoids with the associated location in the storage module 220, and assembling the given one of the M solenoids into the module body 228 for the M solenoids at 572.

The transmission assembler 212 may generate the transmission data 256 for the transmission 236 and mark the transmission 236 with the transmission ID at 574. The transmission assembler 212 may associate the module body ID with the transmission ID in the storage module 220 at 578. The transmission assembler 212 may associate the M solenoid Ds and the M locations with the transmission ID in the storage module 220 at 582. The transmission assembler 212 may assemble the module body 228 (including the M solenoids in the M locations) into the transmission 236 at 586.

Figure 6:
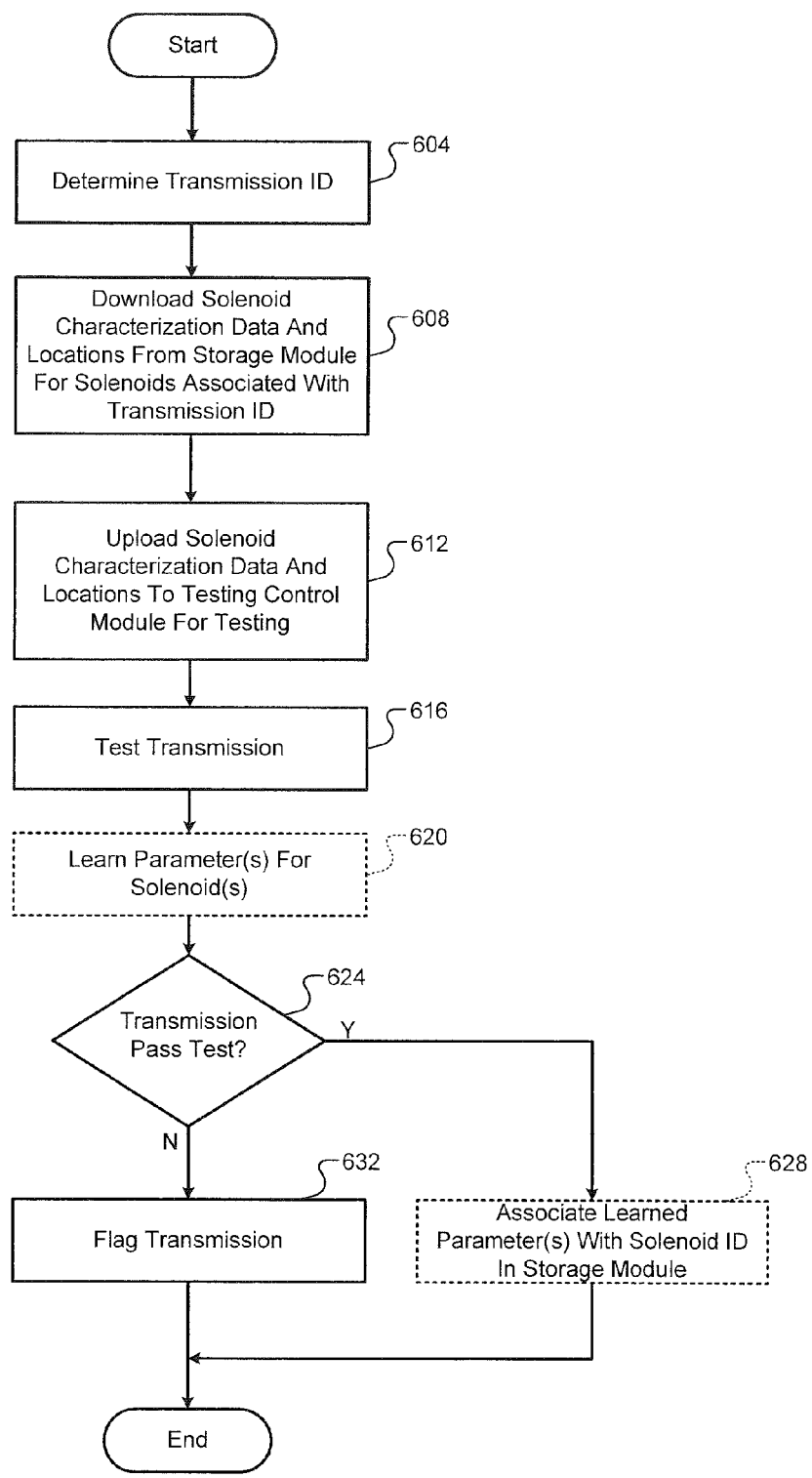
FIG. 6 is a flowchart depicting an example method of testing a transmission and providing additional solenoid related data according to the present disclosure.

FIG. 6 includes an example method of testing the transmission 236 that may be performed by the transmission assembler 212. Referring now to FIGS. 2 and 6, the transmission assembler 212 may determine the transmission ID of the transmission 236. For example only, the transmission assembler 212 may determine the transmission ID using optical recognition or another suitable type of identifier.

The transmission assembler 212 may determine each of the solenoid IDs and the locations of each of the solenoids associated with the transmission 236 based on the transmission ID and the storage module 220 at 604. The transmission assembler 212 may download the characterization data associated with the solenoid IDs at 608. For example only, the transmission assembler 212 may download the characterization data from the storage module 220 or from a local storage module, such as a tangible storage medium.

At 612, the transmission assembler 212 may upload the downloaded characterization data to a testing control module (not shown). The transmission assembler 212 may upload the downloaded characterization data to the testing control module, for example, by solenoid location such that the testing control module can control a solenoid at a given location based on the characterization data associated with that solenoid. The testing control module may also include a predetermined routine for controlling the transmission 236 in a predetermined manner for testing. Once the downloaded characterization data is uploaded to the testing control module, the testing control module may be ready to control the transmission 236 and the solenoids assembled into the transmission 236 based on the downloaded characterization data.

The transmission assembler 212 may test the operability of the transmission 236 and the solenoids using the characterization data at 616. One or more additional parameters 260 may be learned for one or more of the solenoids of the transmission 236 at 620. For example only, one or more offsets and/or scalars may be learned as a function of one or more operating conditions for one or more of the solenoids. The transmission assembler 624 or the testing control module may determine whether the transmission passed the test at 624. If so, the transmission assembler 212 may associate the additional parameter(s) with the solenoid ID(s), respectively, in the storage module 220 at 628. Otherwise, the transmission 236 may be flagged as not having passed the test at 632.

Figure 7:
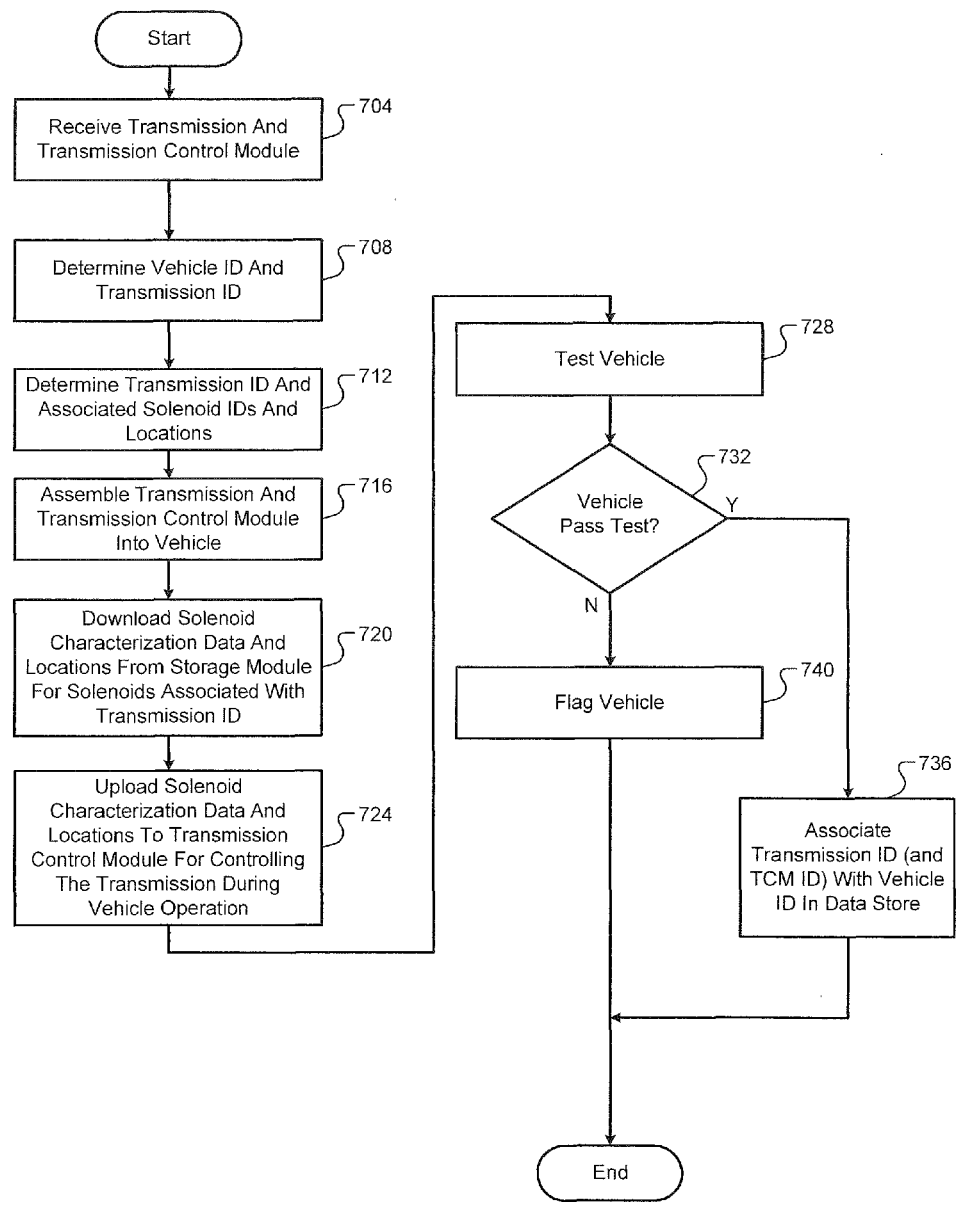
FIG. 7 is a flowchart depicting an example method of assembling and readying a vehicle including a transmission control module and a transmission according to the present disclosure.

Referring back to FIG. 2, the transmission assembler 212 may provide tested transmissions 264 to a vehicle assembler 268. The vehicle assembler 268 may be an entity of the vehicle manufacturer 224 in various implementations. The vehicle assembler 268 also receives the transmission control modules 244. The vehicle assembler 268 assembles a tested transmission 264 and a TCM 244 into a vehicle, programs the TCM 244 based on the characterization data associated with the solenoids of the tested transmission 264. FIG. 7 is an example method of assembling a vehicle that may be performed by a vehicle assembler 268.

Referring now to FIGS. 2 and 7, the vehicle assembler 268 may receive the tested transmissions 264, the TCMs 244, and other vehicle components at 704. The vehicle assembler 268 may determine a vehicle ID associated with a given vehicle to be assembled at 708. For example only, the vehicle ID may include a vehicle identification number (VIN) or another suitable ID of the given vehicle. The vehicle assembler 268 may also determine the transmission ID of the tested transmission 268 to be assembled into the given vehicle at 708. The vehicle assembler 268 may also generate a TCM ID 270 for the TCM 244 to be assembled into the given vehicle to control the tested transmission 268 and mark the TCM 244 with the TCM ID at 708.

At 712, the vehicle assembler 268 may determine the solenoid IDs and the locations of the solenoids within the tested transmission 268 based on the transmission ID using the storage module 220. The vehicle assembler 268 may assemble the tested transmission 264 and the TOM 244 into the given vehicle at 716. As the TCM 244 and the tested transmission 264 are supplied separately, unlike TEHCMs where a TCM is supplied with module body (including solenoids), the TCM 244 can be located at any location of the given vehicle including outside of the housing of the tested transmission 268.

The vehicle assembler 268 may download the solenoid characterization data associated with the solenoid IDs associated with the tested transmission 264 at 720. The vehicle assembler 268 may download the solenoid characterization data from the storage module 220 or a local storage module in various implementations. The vehicle assembler 268 may upload the solenoid characterization data for the solenoids within the tested transmission 264 to the TCM 244 based on the locations at 724. In this manner, the TOM 244 can control the solenoids within the tested transmission 264 based on the associated characterization data during operation of the given vehicle during and after end of line vehicle testing. For example only, during vehicle operation, the TCM 244 may determine a desired pressure for each of the solenoids at a given time, determine a desired current to apply to each of the solenoids based on the solenoids associated characterization data and control current to the solenoids based on the desired currents, respectively.

The vehicle assembler 268 may test the given vehicle including the tested transmission 264, the TCM 244, etc. at 728. This vehicle testing may be referred to as end of line vehicle testing. The vehicle assembler 268 may determine whether the given vehicle passed the test at 732. If so, the vehicle assembler 268 may associate the transmission ID with the vehicle ID in the storage module 220 at 736. The vehicle assembler 268 may also associate the TCM ID 270 with the vehicle ID in the storage module 220 at 736. If false, the vehicle assembler 268 may flag the given vehicle as not having passed the test at 740.

Figure 8:
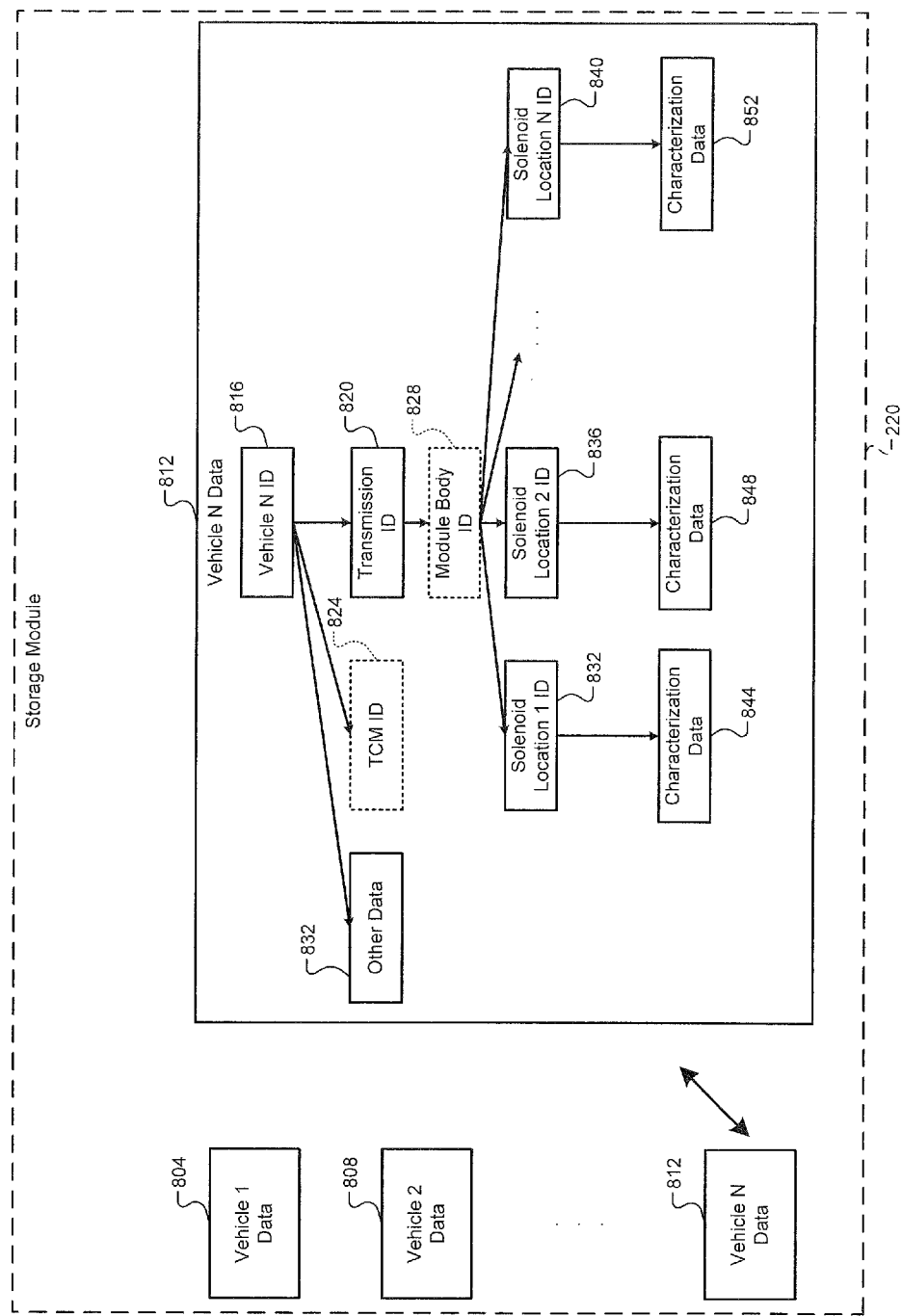
FIG. 8 is an illustration of an example data structure of a storage module according to the present disclosure.

FIG. 8 includes an illustration of an example structure of data stored within the storage module 220. Referring now to FIGS. 2 and 8, the storage module 220 includes data for each vehicle assembled by the vehicle assembler 268 including data associated with a first vehicle 804, data associated with a second vehicle 808, . . . , and data associated with an N-th vehicle 812, where N is an integer greater than zero.

An exploded illustration of the data associated with the N-th vehicle 812 is provided, but the structure of data associated with other vehicles may be similar or identical. The data associated with the N-th vehicle 812 includes the vehicle ID 816 associated with the N-th vehicle. The data associated with the N-th vehicle 812 also includes the transmission ID 824 that is associated with the vehicle ID 816. The data associated with the N-th vehicle 812 may also include a TCM ID 824 that is associated with the vehicle ID 816 and/or a module body ID 828 that is associated with the transmission ID 820. The data associated with the N-th vehicle may also include other data 832 that is associated with the vehicle ID 816.

The data associated with the N-th vehicle 812 also includes the solenoid IDs 832, 836, and 840 associated with the transmission ID 820. The solenoid IDs 832, 836, 840 are associated with the transmission ID 830 by the locations of the solenoids, respectively. The data associated with the N-th vehicle 812 also includes solenoid characterization data 844, 848, 852 associated with the solenoid IDs. The data associated with the N-th vehicle 812 may also include other data, such as learned data associated with a given solenoid ID.

Referring again to FIG. 2, a vehicle servicer 272 and/or one or more other entities, including the vehicle manufacturer 224, may selectively replace one or more components of a given vehicle. In contrast with replacing a TEHCM, the availability of data for each given solenoid, transmission, etc. may enable replacement of a component of a transmission individually. FIGS. 9-12 include flowcharts depicting example methods of replacing a vehicle component and updating the data associated with the given vehicle within the storage module 220.

Referring now to FIGS. 2 and 9, the vehicle servicer 272 may remove a TCM from a given vehicle and obtain a new TCM for the given vehicle at 904. The vehicle servicer 272 may determine the vehicle ID of the given vehicle at 908. The vehicle servicer 272 may determine the transmission ID of the transmission of the given vehicle based on the vehicle ID at 912. The vehicle servicer 272 determines the transmission ID by determining the transmission ID associated with the vehicle ID in the storage module 220. The vehicle servicer 272 may also determine the solenoid Ds and the locations of the solenoids associated with the transmission ID in the storage module 220 at 914.

At 916, the vehicle servicer 272 may download the solenoid characterization data associated with the solenoid IDs at 916. The vehicle servicer 272 may upload the solenoid characterization data by the solenoid locations to the new TCM at 920. The vehicle servicer 272 may also upload other data for controlling the transmission to the new TCM at 920. In this manner, the new TCM can control the transmission including the solenoids based on the uploaded data during vehicle operation. The vehicle servicer 272 may associate the TCM ID of the new TCM with the vehicle ID in the storage module 220 at 924. The vehicle servicer 272 may also disassociate the TCM ID of the removed TCM with the vehicle ID in the storage module 220.

FIG. 10 includes a flowchart depicting an example method of replacing a transmission of a given vehicle. Referring now to FIG. 10, the vehicle servicer 272 may remove the transmission of the given vehicle and obtain a new transmission for assembly into the given vehicle at 1004. The vehicle servicer 272 may determine the transmission ID of the new transmission and the vehicle ID of the given vehicle at 1008.

At 1012, the vehicle servicer 272 may determine the solenoid IDs and the locations of the solenoids within the new transmission associated with the transmission ID in the storage module 220. The vehicle servicer 272 downloads the solenoid characterization data associated with the solenoid IDs of the new transmission at 1012.

The vehicle servicer 272 may upload the solenoid characterization data by the solenoid locations to the (existing) TCM of the vehicle at 1016. In this manner, the TCM can control the solenoids of the new transmission during vehicle operation. The vehicle servicer 272 may associate the transmission ID of the new transmission with the vehicle ID in the storage module 220 at 1020. The vehicle servicer 272 may also disassociate the transmission ID of the removed transmission from the vehicle ID in the storage module 220.

Figure 11:
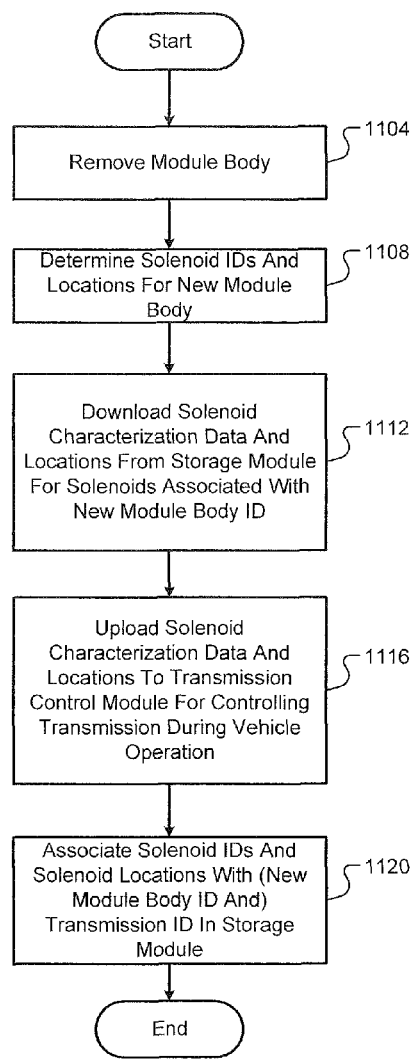

FIG. 11 includes a flowchart depicting an example method of replacing a module body of a given vehicle that may be performed by the vehicle servicer 272. Referring now to FIGS. 2 and 11, the vehicle servicer 272 may remove the module body from the transmission of the given vehicle and obtain a new module body at 1104. The new module body may or may not include new solenoids.

At 1108, the vehicle servicer 272 may determine the solenoid Ds and the locations of the solenoids of the new module body. For example only, the vehicle servicer 272 may determine the solenoid IDs and the locations using optical recognition or another suitable type of identifier.

The vehicle servicer 272 may download the characterization data associated with the solenoid IDs in the storage module 220 at 1112. The vehicle servicer 272 may upload the solenoid characterization data by the solenoid locations to the (existing) TCM of the vehicle at 1116. In this manner, the TCM can control the solenoids of the new module body during vehicle operation. The vehicle servicer 272 may associate the module body ID of the new module body with the transmission ID in the storage module 220 at 1120. The vehicle servicer 272 may also disassociate the module body ID of the removed module body from the transmission ID in the storage module 220. The transmission ID may be determined based on the vehicle ID stored in the storage module 220.

Figure 12:
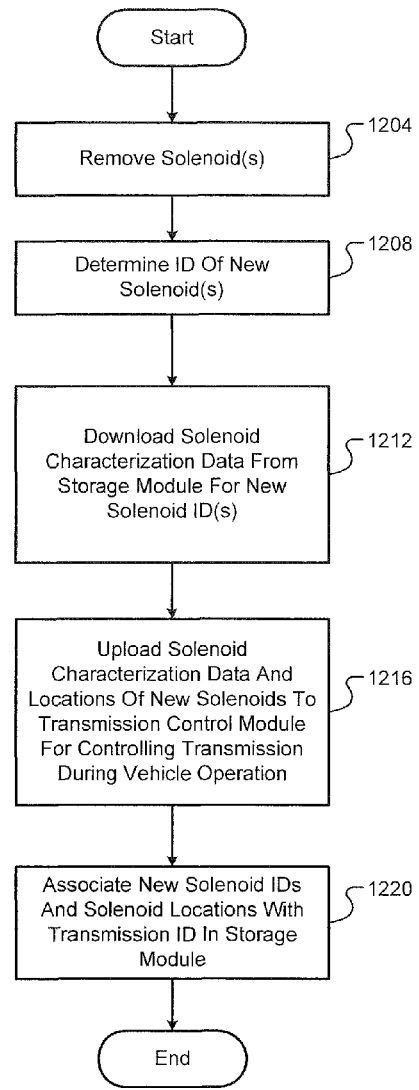

FIG. 12 is a flowchart depicting an example method of replacing a solenoid of a transmission of a given vehicle that may be performed by the vehicle servicer 272. Referring now to FIGS. 2 and 12, the vehicle servicer 272 may remove the one or more solenoids from the transmission of the given vehicle and obtain one or more new solenoids at 1204.

At 1208, the vehicle servicer 272 may determine the solenoid ID(s) of the new solenoid(s). The vehicle servicer 272 may download the characterization data associated with the solenoid ID(s) in the storage module 220 at 1212. The vehicle servicer 272 may upload the characterization data associated with the new solenoids to the TCM of the given vehicle at 1216. In this manner, the TCM can control the new solenoid (s). The vehicle servicer 272 may associate the solenoid ID(s) of the new solenoid(s) by location of the new solenoid(s) with the transmission ID in the storage module 220 at 1220. The vehicle servicer 272 may also disassociate the solenoid ID(s) of the removed solenoid(s) from the transmission ID in the storage module 220. The transmission ID may be determined based on the vehicle ID of the given vehicle stored in the storage module 220.

Figure 13:
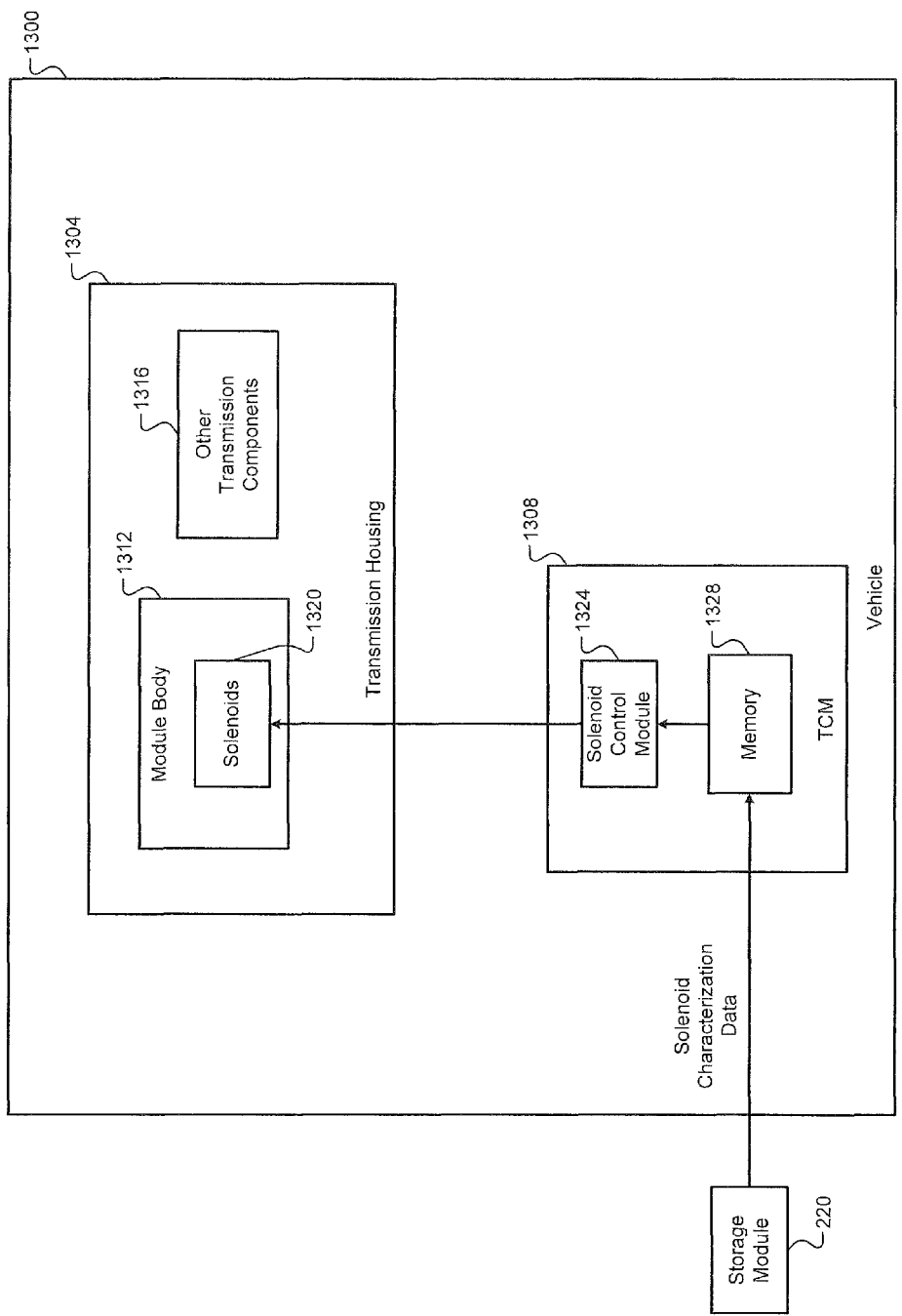
FIG. 13 is a block diagram of an example vehicle according to the present disclosure.

FIG. 13 is a block diagram of an example vehicle system. Among other things, a vehicle 1300 includes a transmission housing 1304 and a transmission control module (TCM) 1308. A module body 1312 is implemented within the transmission housing 1304 with one or more other transmission components 1316, such as one or more clutches, gears, actuators, shafts, etc. A plurality of solenoids 1320 are implemented within the module body 1312 and within the transmission housing 1304.

The TCM 1308 includes a solenoid control module 1324 and memory 1328. The characterization data for each of the solenoids 1320 can be obtained from the storage module 220 and stored in the memory 1328. Additionally, the locations of each of the solenoids 1320 can be obtained from the storage module 220, and the characterization data can be stored based on the locations. The solenoid control module 1324 controls current input to the solenoids 1320 based on the characterization data and the locations of the solenoids, respectively. One or more parameters used by the solenoid control module 1324 in controlling the current input to the solenoids 1320 may be adjusted based on the TCM 1308 being implemented externally to the transmission housing 1304, such as hardware input/output (HWIO) parameters.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method comprising:
   receiving M solenoids, each marked with a unique one of M identifiers, where M is an integer greater than one;
   receiving M lookup tables associated with respective ones of the M identifiers, wherein each of the M lookup tables establishes a relationship between input current and output pressure for only one of the M solenoids;
   assembling a transmission with a selected one of the M solenoids;
   selecting one of the M lookup tables based on one of the M identifiers marked on the selected one of the M solenoids;
   storing the selected one of the M lookup tables in memory of a transmission control module of a vehicle that is assembled with the transmission; and
   controlling output pressure of the selected one of the M solenoids based on the selected one of the M lookup tables and the input current using the transmission control module.

2. The method of claim 1 further comprising assembling the vehicle with the transmission control module fixed to the vehicle externally to a housing of the transmission.

3. The method of claim 1 further comprising storing the selected one of the M lookup tables in the memory of the transmission control module based on a location of the selected one of the M solenoids in one of N available solenoid locations within the transmission,
wherein N is an integer greater than 1.

4. The method of claim 3 further comprising controlling the output pressure of the selected one of the M solenoids further based on the location using the transmission control module.

5. The method of claim 1 further comprising determining the one of the M identifiers marked on the selected one of the M solenoids based on a second unique identifier of the transmission.

6. The method of claim 5 further comprising determining a location of the selected one of the M solenoids within the transmission based on the second unique identifier of the transmission,
wherein the location is one of N available solenoid locations within the transmission and N is an integer greater than 1.

7. The method of claim 6 further comprising:
storing the selected one of the M lookup tables in the memory of the transmission control module based on the location of the selected one of the M solenoids; and
controlling the output pressure of the selected one of the M solenoids further based on the location using the transmission control module.

8. The method of claim 6 further comprising selectively associating the one of the M lookup tables, the location of the selected one of the M solenoids, and the one of the M identifiers with the second unique identifier of the transmission in a storage module that is external to the vehicle.

9. The method of claim 8 further comprising:
assembling the vehicle with the transmission; and
associating the second unique identifier of the transmission with a third unique identifier marked on the vehicle.

10. The method of claim 1 further comprising:
generating additional data for controlling the selected one of the M solenoids;
storing the additional data in the memory of the transmission control module; and
controlling the output pressure of the selected one of the M solenoids further based on the additional data using the transmission control module.

11. A method comprising:
receiving data at a storage module indicating a unique identifier marked on a solenoid;
receiving a lookup table at the storage module that is associated with the unique identifier and that establishes a relationship between input current and output pressure for the solenoid;
storing the lookup table from the storage module in memory of a transmission control module of a vehicle; and
controlling output pressure of the solenoid within a transmission of the vehicle based on the lookup table using the transmission control module.

12. The method of claim 11 further comprising obtaining the lookup table from the storage module based on the unique identifier.

13. The method of claim 11 further comprising assembling the vehicle with the transmission control module fixed to the vehicle externally to a housing of the transmission.

14. The method of claim 11 further comprising storing the lookup table in the memory of the transmission control module based on a location of the solenoid in one of N available solenoid locations within the transmission,
wherein N is an integer greater than 1.

15. The method of claim 14 further comprising controlling the output pressure of the solenoid further based on the location using the transmission control module.

16. The method of claim 11 further comprising:
determining the unique identifier marked on the solenoid based on a second unique identifier marked on the transmission; and
obtaining the lookup table from the storage module based on the unique identifier of the solenoid.

17. The method of claim 16 further comprising:
determining a third unique identifier marked on the vehicle; and
associating the second unique identifier of the transmission with the third unique identifier of the vehicle in the storage module.

18. The method of claim 17 further comprising:
determining a fourth unique identifier marked on the transmission control module; and
associating the fourth unique identifier of the transmission control module with the third and second unique identifiers in the storage module.

19. The method of claim 11 further comprising:
generating additional data for controlling the solenoid; and
associating the additional data with the unique identifier of the solenoid in the storage module.

20. The method of claim 19 further comprising:
storing the additional data in the memory of the transmission control module; and
controlling the output pressure of the solenoid further based on the additional data using the transmission control module.

* * * * *